D. M. MEFFORD & J. J. CURRAN
Spice-Boxes.
No. 152,396. Patented June 23, 1874.
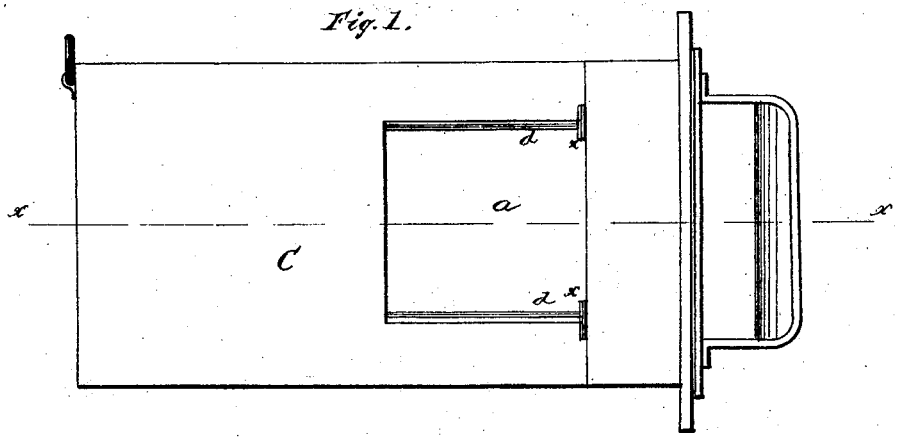
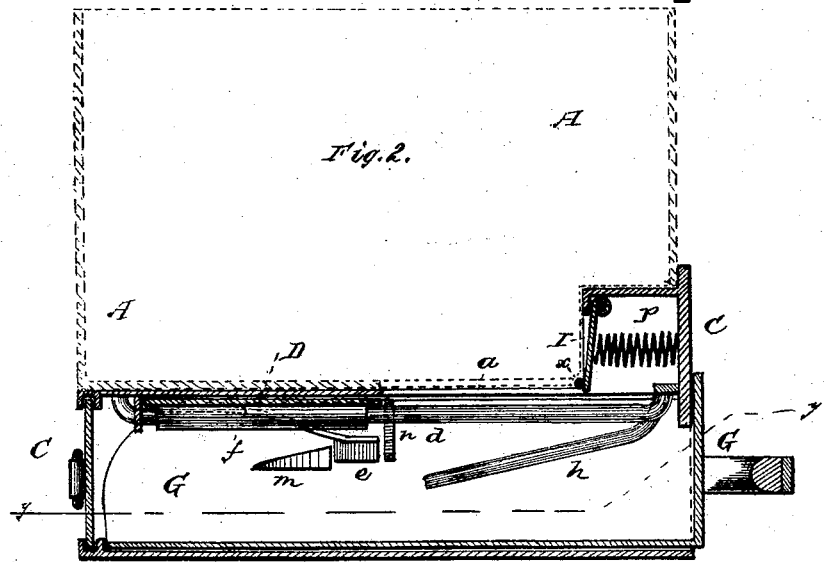
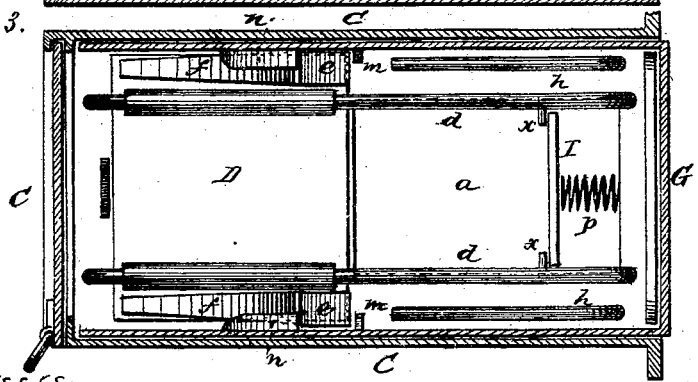
WITNESSES:
P. C. Dieterich
Aib Muloc
INVENTORS.
David M. Mefford
John J. Curran
per:
C. H. Watson & Co
ATTORNEYS.

UNITED STATES PATENT OFFICE.

DAVID M. MEFFORD AND JOHN J. CURRAN, OF TOLEDO, OHIO.

IMPROVEMENT IN SPICE-BOXES.

Specification forming part of Letters Patent No. 152,396, dated June 23, 1874; application filed May 29, 1874.

*To all whom it may concern:*

Be it known that we, DAVID M. MEFFORD and JOHN J. CURRAN, of Toledo, in the county of Lucas and State of Ohio, have invented certain new and useful Improvements in Spice-Boxes; and we do hereby declare that the following is a full, clear, and exact description thereof, reference being had to the accompanying drawings, and to the letters of reference marked thereon, which form a part of this specification:

Our invention relates to such boxes as are used for holding coffee, tea, sugar, spices, or other similar articles, particularly for the convenience of grocers in retail trade; and the nature of our invention consists in providing such box with an automatically-operating slide, opened and closed by a sliding scoop; and also in the construction and arrangement of parts, as will be hereinafter more fully set forth.

In order to enable others skilled in the art to which our invention appertains to make and use the same we will now proceed to describe its construction and operation, referring to the annexed drawing.

Figure 1 is a plan view of a box embodying our invention. Fig. 2 is a longitudinal vertical section, and Fig. 3 is a horizontal section, of the same.

A represents a box, of any desired form or dimensions, and made of any suitable material, and which should be provided with a tight-fitting lid. In handling ground coffee, ground ginger, or similar articles that pack very closely, the box may be formed or provided with a hopper in the bottom, or with a hopper-shaped bottom; but this we do not deem essential. On or under the bottom of the box A is attached a smaller box, C, in the top of which is an aperture, $a$, corresponding with the opening in the lower end of the hopper or hopper-shaped bottom above mentioned. This smaller box C, which contains the working parts of our invention, may be attached to the under side of the bottom of the box A, and an aperture made in the bottom of the box A to correspond with the aperture in the box C; or, the smaller box C may be placed in and rest on the bottom of the box A, and an aperture cut in the box A near the bottom to admit the scoop, so it can enter the box C and operate the slide therein. The aperture $a$ is closed by means of a slide, D, moving upon horizontal guide-rods $d\ d$. Near the rear end, on the under side of the slide D, at each side, is attached a spring or spring-arm, $f$, which extends forward, and has a hook, $e$, formed on or attached to its front end. G represents a scoop, made in the form of a drawer open at the rear end, and of such size as to fit in the box C, in which it is inserted from the front end, if said box is beneath the box A, or through the opening cut in the front of the box A, as above mentioned, if the box C rests on the bottom thereof. The sides of the scoop may be rounded, as shown at their rear ends; and at a certain point on the inner side of each side piece are formed shoulders $m$ and $n$. Immediately above the front end of the aperture $a$ in the box C is arranged a yielding plate or curtain, I, held in proper position by a spring, $p$, against stops $x\ x$. This plate or curtain may be made of any suitable material; and in lieu of plate and spring a thin brush or rubber of suitable thickness may be used.

Supposing the drawer-scoop G is removed from the box C, and the slide D closed. When the scoop is now inserted in the box C it moves along until the hooks $e$ of the springs $f$ strike the shoulders $m$, the springs being elevated and held up by means of rods $h\ h$. Then the scoop will push the slide backward so that when the scoop is fully inserted the slide is wholly open, and as the springs $f$ pass off from the rods $h$ the hooks $e$ will settle down in the spaces between the shoulders $m\ n$. When the scoop is withdrawn again the hooks $e$, catching on the shoulders $n$, cause the slide D to close at the same time; and as the slide closes the springs are raised by the rods $h$, so that the hooks $e$ will rise above the shoulders $n$, and allow the scoop to be moved on outward.

By this device, whether the scoop is in its place or not, the box A is perfectly closed, preventing the ingress of all dust and dirt, and also preventing the deterioration of the article in the box by exposure to the air.

In closing the aperture $a$ the slide D shuts against the yielding or elastic curtain I. This is only important when unground coffees, spices, or other coarse commodity is sought to be handled.

It will readily be seen that the slide D, operating against an unyielding edge, would catch coffee grains or similar articles between it and the front of the aperture, and prevent the slide from closing. This is prevented by having the front part of the aperture yielding or elastic.

Having thus fully described our invention, what we claim as new, and desire to secure by Letters Patent, is—

1. The combination, with a box, A, of a sliding scoop, G, arranged in a receptacle on or under the bottom of said box, and communicating therewith, of an automatic horizontal slide, D, adapted to be operated in both directions by the movement of the scoop, substantially as and for the purposes herein set forth.

2. The combination of the slide D, guide-rods $d\ d$, springs $f\ f$ with hooks $e\ e$, the rods $h\ h$, and the shoulders $m\ n$, on the scoop G, substantially as and for the purposes herein set forth.

3. The elastic or yielding curtain I, in combination with the box C, provided with the aperture $a$, and the slide D, for the purposes herein set forth.

In testimony that we claim the foregoing as our own we affix our signatures in presence of two witnesses.

DAVID M. MEFFORD.
JOHN J. CURRAN.

Witnesses:
E. W. TOLERTON,
H. L. HOLLOWAY.